(12) United States Patent
Kane et al.

(10) Patent No.: US 7,437,815 B2
(45) Date of Patent: Oct. 21, 2008

(54) SYSTEMS ADAPTED TO COOPERATE WITH AN APERTURE FORMING TOOL AND METHODS

(75) Inventors: Kristopher A. Kane, Cincinnati, OH (US); James E. Kesterman, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 600 days.

(21) Appl. No.: 10/837,202

(22) Filed: Apr. 30, 2004

(65) Prior Publication Data

US 2005/0254910 A1    Nov. 17, 2005

(51) Int. Cl.
*B23P 11/00* (2006.01)
*B23P 17/00* (2006.01)
*B21D 39/00* (2006.01)
*B23B 41/08* (2006.01)
*F16L 35/00* (2006.01)
*F16B 4/00* (2006.01)

(52) U.S. Cl. ............... 29/423; 29/422; 29/432; 29/510; 29/511; 29/512; 285/27; 285/382.4; 137/15.12; 137/15.13; 408/115 B (58) Field of Classification Search ........... 29/423, 29/422, 432, 510–512; 285/27, 339, 382.4; 137/15.08, 15.12–15.13; 408/72 B, 72 R, 408/115 R, 241 B, 92, 112
See application file for complete search history.

(56) References Cited

U.S. PATENT DOCUMENTS

| | | | |
|---|---|---|---|
| 979,819 A | 12/1910 | Anderson | |
| 1,219,222 A | 3/1917 | Baxter et al. | |
| 1,246,033 A | 11/1917 | Adams | |
| 1,268,947 A | 6/1918 | Fell | |
| 1,289,490 A | 12/1918 | Lundstrom | |
| 1,313,386 A | 8/1919 | Jones | |
| 1,689,066 A | 10/1928 | Baxter | |
| 1,748,006 A * | 2/1930 | Wohlart | 408/72 B |
| 2,340,936 A | 2/1944 | Cook | |
| 2,457,709 A * | 12/1948 | Nolde | 408/241 R |
| 2,499,409 A | 3/1950 | Norway | |
| 2,507,545 A | 5/1950 | Samiran | |
| 2,543,840 A * | 3/1951 | Reuen | 408/241 R |
| 2,685,891 A | 8/1954 | Segelhorst et al. | |

(Continued)

FOREIGN PATENT DOCUMENTS

| | | |
|---|---|---|
| DE | 1750504 A1 | 8/1971 |
| DE | 8802675 | 4/1988 |
| DE | 8805087 U1 | 6/1988 |
| DE | 19941820 C1 | 2/2001 |
| EP | 0437142 | 7/1991 |

(Continued)

OTHER PUBLICATIONS

European Search Report for App. No. 05009176 dated Aug. 5, 2005.

(Continued)

*Primary Examiner*—David P. Bryant
*Assistant Examiner*—Alexander P Taousakis
(74) *Attorney, Agent, or Firm*—Dinsmore & Shohl, LLP (57) ABSTRACT

Systems and methods are provided wherein a tube insert is at least partially disposed within the end portion of a tube. An alignment fixture can be used to assist in forming an aperture through the wall of the tube at a predetermined location that is aligned with at least one cavity in the outer surface of a tube insert.

21 Claims, 6 Drawing Sheets

U.S. PATENT DOCUMENTS

| | | | |
|---|---|---|---|
| 2,811,179 A | 10/1957 | Greenwood | |
| 2,839,082 A | 6/1958 | Moore et al. | |
| 2,918,931 A | 12/1959 | Siri | |
| 2,918,932 A | 12/1959 | Few | |
| 2,942,500 A * | 6/1960 | Conner | 408/72 B |
| 3,078,867 A | 2/1963 | McGillis et al. | |
| 3,610,273 A | 10/1971 | Russell | |
| 3,661,175 A | 5/1972 | Tillman | |
| 3,791,407 A | 2/1974 | Nicholls | |
| 3,794,077 A | 2/1974 | Fanshier | |
| 3,874,808 A * | 4/1975 | Zaccardelli et al. | 408/1 R |
| 3,963,041 A | 6/1976 | McGillis | |
| 4,308,894 A | 1/1982 | Carpentier | |
| 4,479,669 A | 10/1984 | Hynes | |
| 4,667,711 A | 5/1987 | Draft | |
| 4,793,387 A | 12/1988 | LeBlanc et al. | |
| 4,896,705 A | 1/1990 | Podgers et al. | |
| 4,986,320 A | 1/1991 | Kesterman et al. | |
| 4,998,571 A | 3/1991 | Blue et al. | |
| 5,086,843 A | 2/1992 | Mims et al. | |
| 5,117,877 A | 6/1992 | Sharp | |
| 5,152,315 A | 10/1992 | Lagache | |
| 5,163,470 A | 11/1992 | Maeshiba | |
| 5,174,345 A | 12/1992 | Kesterman et al. | |
| 5,207,241 A | 5/1993 | Babb | |
| 5,241,983 A | 9/1993 | Lagache | |
| 5,398,735 A | 3/1995 | Lagache | |
| 5,522,415 A | 6/1996 | Hopenfeld | |
| 5,564,464 A | 10/1996 | Pendleton et al. | |
| 5,564,465 A | 10/1996 | Pettesch | |
| 5,655,565 A | 8/1997 | Phillips et al. | |
| 5,664,951 A * | 9/1997 | Clary et al. | 439/92 |
| 5,839,465 A | 11/1998 | Phillips et al. | |
| 5,887,614 A | 3/1999 | Weeks et al. | |
| 6,138,707 A | 10/2000 | Stuart | |
| 6,206,056 B1 | 3/2001 | Lagache | |
| 6,267,156 B1 | 7/2001 | Argandona | |
| 6,318,421 B1 | 11/2001 | Lagache | |
| 6,523,564 B1 | 2/2003 | Phillips | |
| 6,523,581 B2 | 2/2003 | Pendleton et al. | |
| 6,536,465 B2 | 3/2003 | David et al. | |
| 6,655,418 B1 | 12/2003 | McGill et al. | |
| 6,669,413 B1 * | 12/2003 | Neeld et al. | 408/79 |
| 6,874,528 B2 | 4/2005 | Kozik et al. | |
| 6,913,047 B1 | 7/2005 | Kane et al. | |
| 7,069,965 B2 * | 7/2006 | Pendleton et al. | 141/88 |
| 2002/0179178 A1 | 12/2002 | Pendleton et al. | |
| 2004/0017081 A1 | 1/2004 | Simpson et al. | |
| 2005/0241695 A1 | 11/2005 | Pendleton et al. | |
| 2005/0241696 A1 | 11/2005 | Kane et al. | |
| 2005/0241722 A1 | 11/2005 | Pendleton et al. | |
| 2005/0241723 A1 | 11/2005 | Pendleton et al. | |

FOREIGN PATENT DOCUMENTS

| | | |
|---|---|---|
| FR | 1360869 | 4/1964 |
| FR | 1377087 A | 10/1964 |
| FR | 1526790 | 5/1968 |
| FR | 2194908 A | 3/1974 |
| FR | 2197161 A | 3/1974 |
| FR | 2205166 | 5/1974 |
| FR | 2270198 | 12/1975 |
| FR | 2331732 | 6/1977 |
| FR | 2355736 | 1/1978 |
| GB | 0966842 A | 8/1964 |
| GB | 1222364 | 2/1971 |
| GB | 1444260 | 7/1976 |
| GB | 1531083 | 1/1978 |
| GB | 2064041 A | 6/1981 |
| GB | 2309767 A | 8/1997 |

OTHER PUBLICATIONS

*OPW Instructions*—Assembly and Installation Instructions for OPW 61-SO and 61-SOM Carb Required Overfill Prevention Valves; pp. 1-11; Jan. 1993.

*Polymod® Elastomer Sealing Materials*, Chris M.A. Chilson, Jun. 15, 2000.

*Parker Total Sealing Systems*, Parker Seal Group, Irvine, CA, 1989. *Parker PolyPak Seals*.

* cited by examiner

SYSTEMS ADAPTED TO COOPERATE WITH AN APERTURE FORMING TOOL AND METHODS

TECHNICAL FIELD

The present invention relates generally to systems adapted to cooperate with an aperture forming tool and methods, and more specifically to a system and methods for attaching a tube insert to a tube.

BACKGROUND OF THE INVENTION

It is known to attach a tube insert to a tube as shown, for example, in FIG. 5 of U.S. Pat. No. 6,523,581, wherein a nozzle is attached relative to a tube with a bolt and nut arrangement. When attaching the nozzle to the tube, the nozzle might first be disposed within an end portion of the tube. Next, a hole might be bored through the walls of the tube and nozzle after which the bolt and nut arrangement may be installed to attach the nozzle to the tube.

A new type of tube insert is disclosed herein that includes a cavity for fastening but is devoid of any opening extending through its inner and outer surfaces. The new type of tube insert provides advantages by eliminating potential vapor leakage paths through the tube insert and may simplify installation procedures that might otherwise be required to eliminate potential vapor leakage paths through known tube inserts, for example, such as the known tube inserts disclosed by U.S. Pat. No. 6,523,581.

There is a need for systems and methods for attaching the new type of tube insert to a tube. After insertion of the tube insert within the tube, the cavity is hidden by the wall of the tube. An aperture must be formed that corresponds to the hidden cavity such that a fastener may be used to attach the tube insert to the tube. Therefore, there is a need for systems and methods that facilitate aperture formation at a predetermined location that is aligned with the hidden cavity.

SUMMARY OF THE INVENTION

Accordingly, it is an object of the present invention to obviate problems and shortcomings of the prior art. More particularly, it is an object of the present invention to provide systems and methods for forming an aperture in a tube that is provided with a tube insert.

To achieve the foregoing and other aspects and in accordance with the present invention, a system adapted to cooperate with an aperture forming tool is provided. The system includes a tube with a wall and an end portion. The tube insert is at least partially disposed within the end portion of the tube and includes a first registration structure, an outer surface, and at least one cavity in the outer surface. The system further includes an alignment fixture with a second registration structure adapted to cooperate with the first registration structure of the tube insert to inhibit a relative movement between the alignment fixture and the tube insert. The alignment fixture further includes an alignment device adapted to receive at least a portion of a tool to assist in forming an aperture through the wall of the tube at a predetermined location that is aligned with at least one cavity in the outer surface of the tube insert.

To achieve further aspects and in accordance with the present invention, a method of securing a tube insert to an end portion of a tube is provided. The method includes the steps of providing a tube and a tube insert. The tube is provided with an end portion and a wall with inner and outer surfaces. The tube insert is provided with a registration structure and a wall with inner and outer surfaces. The wall of the tube insert includes at least one cavity in the outer surface of the tube insert that is adapted to receive a fastener. The wall of the tube insert is also devoid of any openings extending through its inner and outer surfaces. The method further includes the step of providing an alignment fixture adapted to cooperate with the registration structure of the tube insert to inhibit a relative movement between the alignment fixture and the tube insert. The alignment fixture includes an alignment device. The method further includes the step of providing an aperture forming tool for forming an aperture through the wall of the tube. Still further, the method includes the steps of disposing the tube insert at least partially within the end portion of the tube and positioning the alignment fixture relative to the tube insert such that the alignment fixture engages the registration structure of the tube insert to inhibit a relative movement between the alignment fixture and the tube insert and to align the alignment device with respect to at least one cavity in the wall of the tube insert. The method further includes the steps of positioning the aperture forming tool with respect to the alignment device such that a portion of the aperture forming tool is aligned with respect to the at least one cavity in the wall of the tube insert and forming an aperture in the wall of the tube with the portion of the aperture forming tool. The method also includes the step of utilizing the cavity in the wall of the tube insert and the aperture formed in the wall of the tube to secure the tube insert to the tube.

To achieve still additional aspects and in accordance with the present invention, a method of securing a tube insert to an end portion of a tube is provided. The method includes the steps of providing a tube including an end portion and a wall with inner and outer surfaces. The method further includes the step of providing a tube insert including a registration structure and a wall with inner and outer surfaces wherein the wall of the tube insert includes at least one cavity in the outer surface of the tube insert. The method further includes the step of providing an alignment fixture adapted to cooperate with the registration structure of the tube insert to inhibit a relative movement between the alignment fixture and the tube insert wherein the alignment fixture includes an alignment device. The method also includes the steps of providing a tool to assist in securing the tube insert to the tube and disposing the tube insert at least partially within the end portion of the tube. Still further, the method includes the step of positioning the alignment fixture relative to the tube insert such that the alignment fixture engages the registration structure of the tube insert to inhibit a relative movement between the alignment fixture and the tube insert and to align the alignment device with respect to at least one cavity in the wall of the tube insert. The method further includes the steps of positioning the tool with respect to the alignment device such that a portion of the tool is aligned with respect to the at least one cavity in the wall of the tube insert and using the tool to assist in securing the tube insert to the tube.

Advantages and novel features of the present invention will become apparent to those skilled in the art from the following detailed description, which simply illustrates various modes and examples contemplated for carrying out the invention. As will be realized, the invention is capable of other different aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

DETAILED DESCRIPTION OF EXEMPLARY EMBODIMENTS

Reference will now be made in detail to various exemplary embodiments of the invention, concepts of which are illustrated in the accompanying drawings, wherein like numerals indicate the same elements throughout the views.

Figure 1:
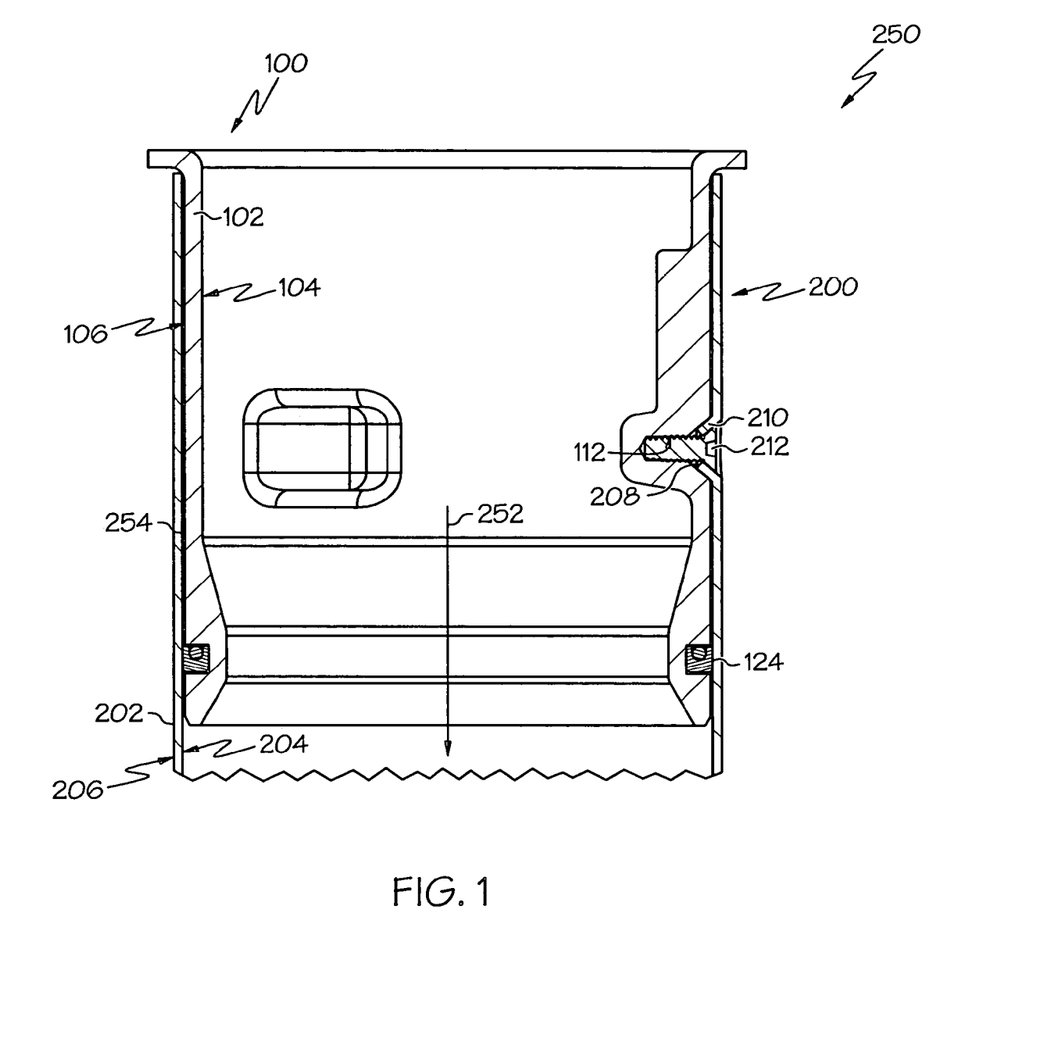
FIG. 1 is a cross sectional view of an apparatus including a tube insert and portions of a tube.

FIG. 1 depicts an exemplary apparatus 250 for use in a wide variety of applications. For example, the illustrated apparatus 250 may be used with a riser pipe of a liquid reservoir, such as a liquid storage tank. Conventional apparatus for use with a riser pipe of a liquid reservoir are disclosed by U.S. Pat. No. 6,523,581, the entire disclosure which is herein incorporated by reference.

As shown, the apparatus 250 in accordance with the present invention includes a tube 200 with a wall 202 with an inner surface 204 and an outer surface 206. The wall 202 can take many shapes in accordance with the concepts of the present invention. For example, the wall 202 can include circular and/or noncircular cross sectional shapes. In particular examples, and as shown in the drawings, the wall may comprise a cylinder with a cylindrical wall wherein the inner surface 204 comprises an inner cylindrical surface and the outer surface 206 comprises an outer cylindrical surface.

The tube 200 can be formed from a wide range of materials and can include materials that will not degrade when exposed to liquid being contained in an associated liquid reservoir. For example, the tube 200 may be formed from materials that will not degrade when exposed to hydrocarbon liquids, slurries, or the like. Exemplary materials may include plastic, metal (e.g., aluminum), or the like.

The apparatus 250 further includes a tube insert 100 at least partially disposed within an end portion of the tube 200. Although the tube insert 100 is shown as inserted partially within an end portion of the tube 200, in alternative embodiments the tube insert 100 may be inserted entirely into an interior area of the tube 200. The tube insert 100 includes a wall 102 with an inner surface 104 and an outer surface 106. At least portions of the inner surfaces 104, 204 of the tube insert 100 and tube 200 cooperate to define a liquid flow path 252.

The wall 102 of the tube insert 100 can take a variety of shapes that may correspond to a shape of an interior portion of the tube 200. For example, the wall 102 can include circular and/or noncircular cross sectional shapes. In particular examples, and as shown in the drawings, the wall 102 may comprise a cylinder wherein the wall 102 comprises a cylindrical wall, the inner surface 104 comprises an inner cylindrical surface and the outer surface 106 comprises an outer cylindrical surface.

The tube insert 100 can also be formed from a wide range of materials and can include materials that will not degrade when exposed to liquid being contained in an associated liquid reservoir. For example, the tube insert 100 may be formed from materials that will not degrade when exposed to hydrocarbon liquids, slurries, or the like. Exemplary materials may include plastic, metal (e.g., aluminum), or the like.

Figure 4:
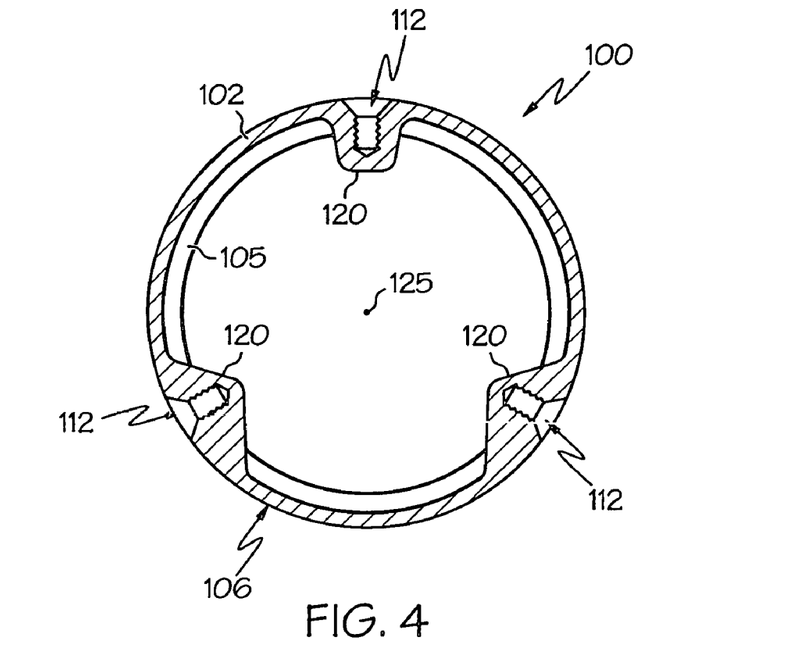
FIG. 4 is a sectional view of the tube insert along line 4-4 of FIG. 3.
Figure 5:
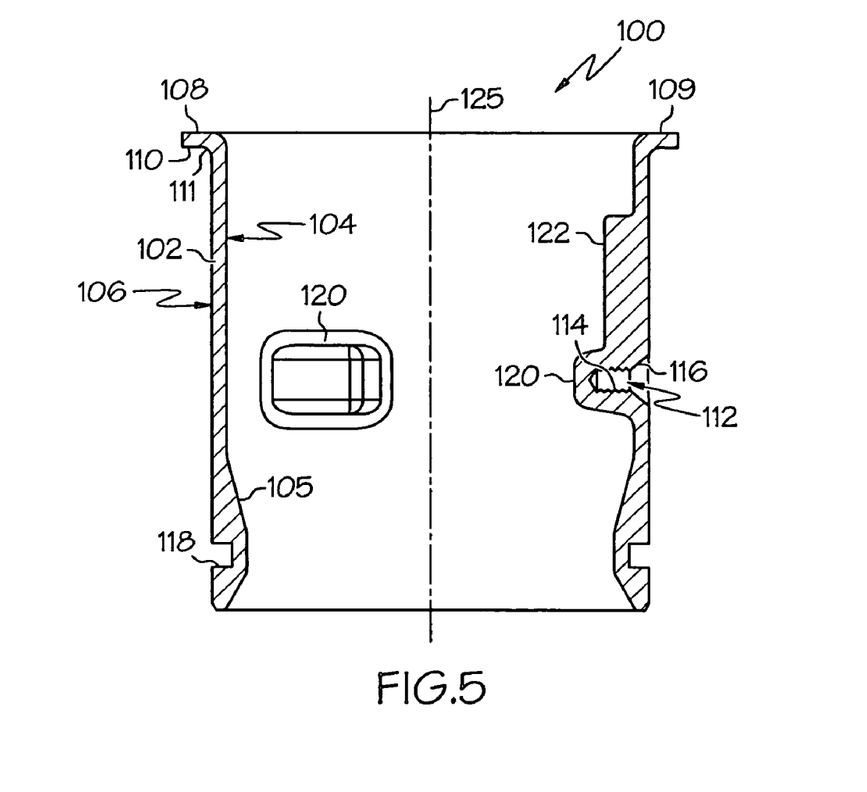
FIG. 5 is a sectional view of the tube insert along line 5-5 of FIG. 3.
Figure 9:
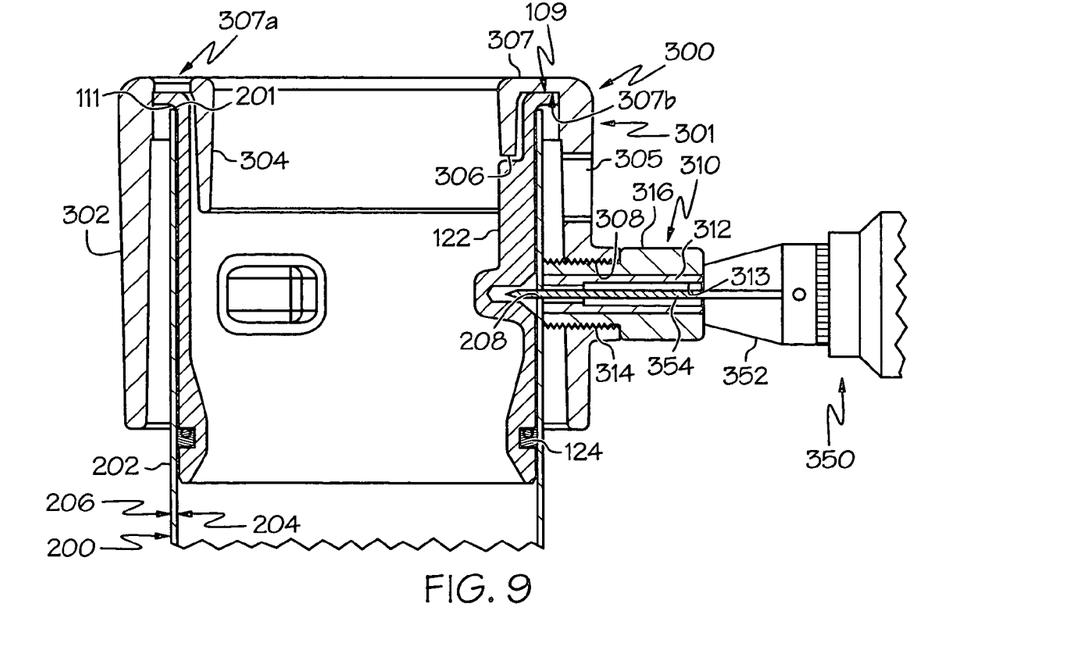
FIG. 9 illustrates a sectional view of the exemplary system and portions of the aperture forming tool taken along line 9-9 of FIG. 8.

The wall 102 of the tube insert 100 is devoid of any opening extending between its inner and outer surfaces. For example, as best shown in FIGS. 4 and 5, the tube insert 100 further includes at least one cavity 112 in the outer surface 106 of the tube insert 100. At least one cavity 112 may be adapted to receive a fastener 212 and/or may be adapted to receive a crimped portion 210 of the tube 200 as shown in FIG. 1. The cavity 112 can optionally include a threaded portion 114 adapted to receive the threaded shank of the fastener 212 and a countersunk portion 116 adapted to receive the head of the fastener 212 and a crimped portion 210 of the tube 200. As shown in FIG. 1, for example, the fastener 212 engages both the cavity 112 and the crimped portion 210 to provide a particularly strong connection between the tube insert 100 and the tube 200. As shown in FIGS. 4 and 5, the apertures may be initially threaded to later receive the threaded portion of a threaded fastener. In alternative embodiments, the apertures may be initially nonthreaded (e.g., as shown in FIG. 9) and threads may be later cut into the cavity wall by a threaded portion of a fastener as the fastener is tightened. Further exemplary cavities might not include a threaded portion. Fasteners in these applications, might comprise a rivet or other fastener adapted to engage a non-threaded cavity.

A sealing member 124 may be positioned between the outer surface 106 of the tube insert 100 and the inner surface 204 of the tube 200. As shown, the tube insert 100 might include a circumferential groove 118 adapted to at least partially receive the sealing member 124. The sealing member 124 can be operative to provide a sealing function between the outer surface 106 of the tube insert 100 and the inner surface 204 of the tube 200. A wide variety of sealing members may be incorporated with the concepts of the present invention. In the illustrated embodiment, the sealing member might comprise a PolyPak® sealing member available from Parker-Hannifin Corporation. The PolyPak® sealing member might be beneficial to provide an excellent sealing function with a wide range of clearance distances and differing clearance distances between the opposed walls of the tube and the tube insert. Moreover, the PolyPak® sealing member can provide a sufficient sealing function without the use of epoxy sealant.

Figure 2:
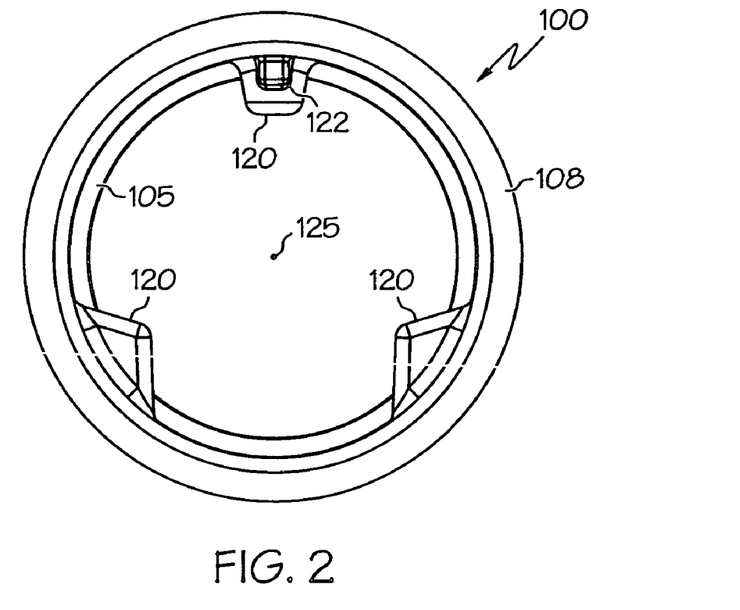
FIG. 2 is a top view of a tube insert from the apparatus of FIG. 1.
Figure 3:
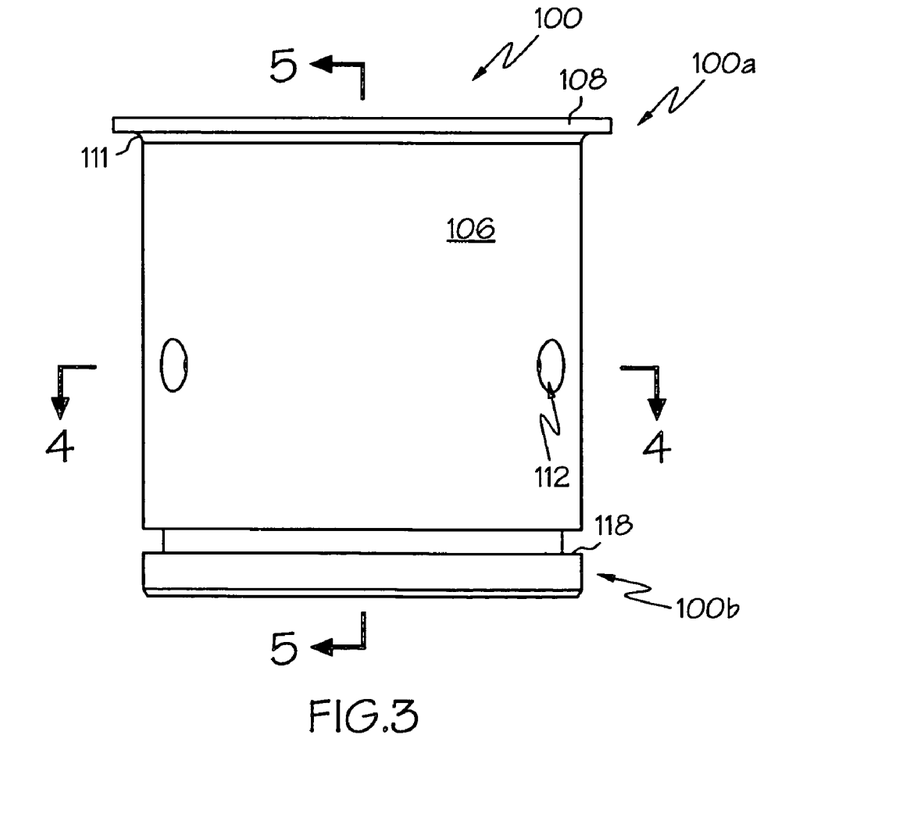
FIG. 3 is a front elevational view of the tube insert of FIG. 2.

While FIG. 1 depicts an exemplary tube insert 100 being secured to an end portion of a tube 200, FIGS. 2-5 illustrate particular features of the tube insert 100 in accordance with the illustrated exemplary embodiment. FIG. 2 is a top view while FIG. 3 is a front elevational view of the exemplary tube insert 100 from the apparatus of FIG. 1. FIG. 4 is a sectional view along line 4-4 of FIG. 3 and FIG. 5 is a sectional view along line 5-5 of FIG. 3.

As shown in FIG. 4 and mentioned previously, the outer surface 106 of the tube insert 100 includes at least one cavity 112. As best shown in FIG. 4, the at least one cavity 112 comprises three cavities that are substantially equally radially disposed about the central axis 125 of the tube insert 100. Although three cavities are illustrated, it is understood that more or less than three cavities may be provided in accordance with the concepts of the present invention. In certain embodiments, the cavities may be nonequally radially disposed about the central axis of the tube. However, providing three or more cavities 112 that are equally radially disposed may facilitate a substantially consistent interstitial space 254 between the outer and inner surfaces 106, 204 at the location of the sealing member 124. Indeed, the fasteners 212 associated with the cavities 112 may provide forces that substantially counter one another. The countering forces may substantially center the tube insert 100 with respect to the tube 200 that may provide the interstitial space 254 with a desired and consistent distance between the outer and inner surfaces 106, 204 at the location of the sealing member 124. Providing a distance within a desired range and/or a substantially consistent distance within a desired range may enhance the effectiveness of the sealing member 124. Indeed, the effectiveness of sealing members are typically maximized when the distance between opposed walls to be sealed is maintained within a certain tolerance range that is acceptable for the particular sealing member in use.

As mentioned, the wall 102 is devoid of any opening extending between its inner surface 104 and its outer surface 106. For example, as illustrated, the cavities 112 are disposed in the wall 102 such that the cavities 112 do not extend between the inner surface 104 and outer surface 106 of the wall 102. Rather the blind end of the cavity 112 stops short of the inner surface 104, thereby avoiding fluid communication between the inner and outer surfaces 104, 106. To prevent the cavities 112 from extending between the inner and outer surface of the wall 102, the wall may include areas of increased wall thickness 120 at locations adjacent each corresponding cavity 112. The areas of increased wall thickness 120 may be shaped as best shown in FIGS. 2 and 4 in order to facilitate formation of the tube insert 100 during a molding process.

As shown in FIGS. 3 and 5, the exemplary tube insert 100 includes a first end portion 100a and a second end portion 100b. In the illustrated embodiment, the first end portion 100a can include a circumferential sealing surface 110 for a sealing member and the second end portion 100b may be provided with the circumferential groove 118 to at least partially receive the sealing member 124. In the particular illustrated embodiment, the first end portion 100a may include a flared portion 108, such as a flange, that includes the circumferential sealing surface 110. The flared portion 108 may be formed by rolling, machining away portions of material, or by other fabrication processes. The circumferential sealing surface 110 may comprise a flat, rounded, and/or other surface configuration suitable for use with a corresponding sealing member. For example, as shown, the circumferential sealing surface 110 may comprise a flat surface in combination with a rounded transition portion 111. As shown in FIG. 9, the transition portion 111 may also act as an axial registration structure. For example, as shown, the transition portion 111 comprises a concave rounded portion that eventually contacts the edge 201 of the end portion of the tube 200 to limit insertion of the tube insert 100 within the end portion of the tube 200. Although not shown, the wall 102 of the tube insert 100 may alternatively include a shoulder adapted to abut the edge 201 of the end portion of the tube 200 wherein the shoulder provides an axial registration structure.

As best shown in FIG. 5, the tube insert 100 may include one or more registration structures that are designed to inhibit a relative movement between an alignment fixture 300 (See FIGS. 7-9) and the tube insert 100. The one or more registration structures of the tube insert 100 are designed to interact with the alignment fixture 300 in order to form one or more apertures 208 in the tube 200 at predetermined locations with respect to the tube insert 100.

In exemplary embodiments, the registration structure of the tube insert 100, may comprise an axial registration structure and/or an angular registration structure. For example, the tube insert 100 may be provided with an axial registration structure adapted to cooperate with an axial registration structure of the alignment fixture 300 to inhibit a relative axial movement between the tube insert 100 and the alignment fixture 300. In the illustrated embodiment, the tube insert 100 includes an axial registration structure comprising an upper surface 109 of the flared portion 108 while the alignment fixture 300 includes an axial registration structure comprising an inner surface 307b of the alignment fixture 300. The upper surface 109 of the flared portion 108 is adapted to abut with the inner surface 307b of the alignment fixture 300 to inhibit a relative axial movement and thereby facilitate a relative axial position of the tube insert 100 and the alignment fixture 300 as shown in FIG. 9.

Figure 7:
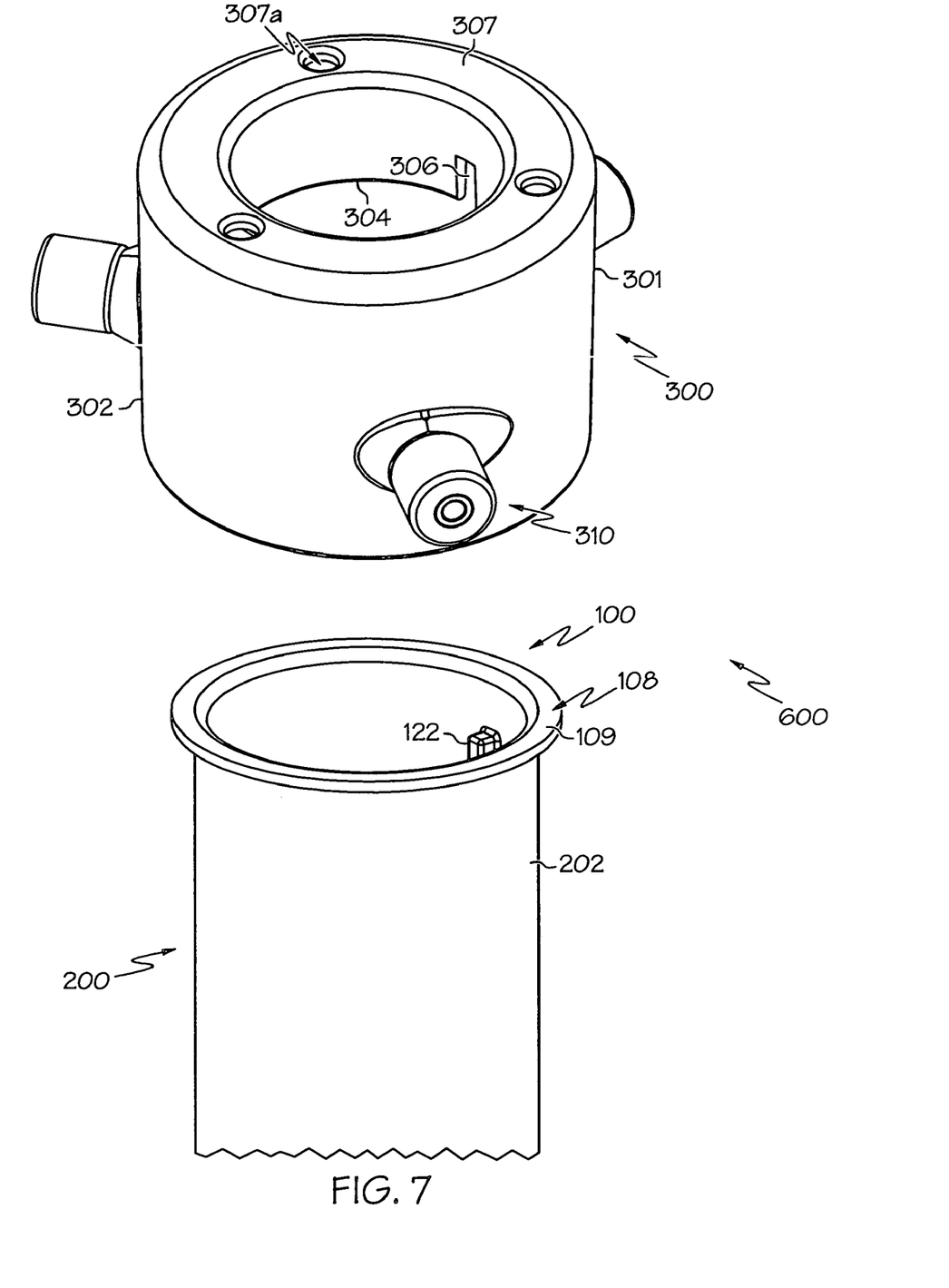
FIG. 7 illustrates a partially exploded view of an exemplary system including an alignment fixture, tube and tube insert.

As best shown in FIGS. 2, 5 and 7, the registration structure, if provided, of the tube insert 100 may also comprise an angular registration structure adapted to cooperate with an angular registration structure of the alignment fixture 300 to inhibit a relative angular movement between the alignment fixture 300 and the tube insert 100. As shown, for example, the tube insert 100 includes an angular registration structure comprising a tongue 122 while the alignment fixture 300 includes an angular registration structure comprising a slot 306. The slot 306 of the alignment fixture 300 is adapted to receive the tongue 122 of the tube insert 100. Therefore, when positioning the alignment fixture relative to the tube insert, the slot 306 may be inserted over the tongue to inhibit, such as prevent, a relative angular movement between the alignment fixture 300 and the tube insert 100 and thereby facilitate a relative angular position of the tube insert 100 and the alignment fixture 300 as shown in FIG. 9. Rather than a slot, the angular registration structure of the alignment fixture may alternatively comprise a recess, such as a groove, adapted to receive the tongue from the tube insert.

Although not shown, the tube insert can alternatively include a slot or recess adapted to receive a tongue of the alignment fixture. In still further embodiments, the angular registration structures might comprise a pair of cooperating inclined shoulders wherein the shoulders are designed to approach one another as the alignment fixture is twisted relative to the tube insert until the shoulders abut one another at the desired relative angular position. Still further, the angular registration structure may also include a noncircular shape of the tube insert and/or the alignment fixture to facilitate the relative angular position. Further angular registration structures may also be incorporated with the concepts of the present invention. For example, angular registration structures may comprise a pin or key adapted to be received in an aperture, a screw adapted to be received in a threaded aperture, or other structural arrangements to facilitate angular registration.

In particular embodiments, the registration structure of the tube insert 100 may comprise a single structure that provides both an axial and an angular registration function. For example, a single tongue may function as an axial stop while also providing an angular registration function.

The alignment fixture 300 and its application will now be discussed in more detail with reference to FIGS. 7-9. FIG. 7 depicts an exemplary system 600 adapted to cooperate with an aperture forming tool 350 (see FIGS. 8 and 9). The illustrated system 600 comprises the tube insert 100, the tube 200, and the alignment fixture 300.

As shown, the tube insert 100 is at least partially disposed within an end portion of the tube 200. The tube insert 100 may slide downward with respect to the tube 200 until the transition portion 111, acting as an axial registration structure, abuts against the edge 201 of the end portion of the tube 200 (see FIG. 9). Once in position, at least one cavity 112 of the tube insert 100 is hidden behind the wall 202 of the tube 200 in instances where the tube wall 202 is opaque (see FIG. 7). In applications where one or more cavities 112 are hidden, the alignment fixture 300 may be provided to assist in forming apertures in the tube wall 202 that are each aligned with a corresponding one of the cavities 112 of the tube insert 100.

As discussed above, the alignment fixture 300 may include one or more registration structures to inhibit a relative movement between the alignment fixture 300 and the tube insert 100. For example, as previously mentioned, the alignment fixture 300 can include an angular registration structure comprising a slot 306 adapted to cooperate with an angular registration structure comprising a tongue 122 of the tube insert 100 to inhibit relative angular movement between the alignment fixture 300 and the tube insert 100. As discussed with respect to the tube insert 100, the angular registration structure of the alignment fixture 300 can take a variety of alternative forms to inhibit a relative angular movement between the alignment fixture 300 and the tube insert 100.

Alternatively, or in addition, the one or more registration structures of the alignment fixture 300 may comprise an axial registration structure to inhibit a relative axial movement between the alignment fixture 300 and the tube insert 100. As discussed above, the axial registration structure, if provided, may comprise an inner surface 307b of a bridge flange 307. In this embodiment, the inner surface 307b of the bridge flange 307 is adapted to abut the upper surface 109 of the flared portion 108 of the tube insert 100 to act as a stop and thereby inhibit a relative axial movement between the alignment fixture 300 and the tube insert 100. Providing the inner surface 307b as an axial stop allows substantially continuous contact with the upper surface 109 about the periphery of the tube insert 100 to provide appropriate axial registration at each point about the periphery of the alignment fixture 300. The bridge flange 307 may also include one or more view ports to permit observation of a relative axial orientation between the alignment fixture 300 and the tube insert 100. As shown, the view ports may comprise a plurality of apertures 307a extending through the bridge flange 307 to permit observation of the upper surface 109 of the tube insert 100 to insure proper registration between the upper surface 109 and the inner surface 307b of the alignment fixture 300 at each point about the periphery of the alignment fixture. Rather than apertures, the view ports may also comprise one or more lenses, a translucent and/or transparent material and/or other viewing structures to permit viewing of the upper surface 109 of the tube insert 100.

The alignment fixture 300 may also include an alignment device 310 adapted to receive at least a portion of the aperture forming tool 350 for forming the one or more apertures 208 through the wall 202 of the tube 200. The alignment device 310 may comprise one or more alignment devices. For example, the alignment fixture 300 may include three alignment devices 310 as shown in FIGS. 7-9. Providing three or more adjustable alignment devices 310, as best shown in FIGS. 7 and 8, allows the alignment fixture 300 to be mounted and appropriately centered with respect to the tube insert 100 and the tube 200.

The alignment fixture 300 can also include a body portion 301 with the alignment device 310 mounted to the body portion. Still further, as shown, the alignment device 310 may be adjustably mounted to the body portion 301. As shown in the body portion 301 may include a mounting aperture 308 wherein at least a portion of the alignment device 310 is adapted to adjustably engage the mounting aperture 308. Providing adjustability between the alignment device 310 and the body portion 301 can introduce many advantages to the alignment fixture 300. For example, as shown, the adjustability of the alignment device 310 with respect to the body portion 301 may provide an alignment device 310 that is adapted to clamp the alignment fixture 300 to the tube 200 to thereby inhibit relative axial and angular rotation between the alignment fixture 300 and the tube insert 200. Adjustability of the alignment device 310 with respect to the body portion 301 may also allow the alignment fixture 300 to be properly clamped to tubes with different dimensions (e.g., diameters). Providing several adjustable alignment devices 310 may also facilitate the ability of centering the alignment fixture 300 with respect to the tube insert 100 as discussed above. In still further examples, and as shown, adjustability of the alignment devices 310 may permit removal of the alignment devices 310 from the corresponding mounting apertures 308. The ability to remove the alignment devices 310 from the mounting apertures 308 permits replacement and/or facilitates repair of worn alignment devices 310 without replacing the entire mounting fixture 300. Moreover, in exemplary embodiments, the ability to remove the alignment devices 310 from the mounting apertures 308 reduces the number of parts and costs associated therewith as a single alignment device 310 may be used and engaged with each of the mounting apertures 308 individually in applications where the apertures are formed in a sequential fashion.

Adjustability between the mounting device 310 and the body portion 301 may be achieved in a variety of ways. For example, as shown, the alignment device 310 may include a threaded shaft 314 adapted to adjustably engage a threaded mounting aperture 308 of the body portion 301. An exterior surface 316 of the alignment devices 310 may be knurled or otherwise provided with a gripping surface (e.g., hex shaped surface) to facilitate tightening of the alignment devices 310 in use. To perform a clamping function, each of the alignment devices 310 may be incrementally rotated to allow centering of the alignment fixture 300 relative to the tube insert 100 while sufficiently clamping the alignment fixture 300 to the tube 200. Although not shown, adjustability may alternatively be obtained without a threaded portion. In these embodiments, once the desired relative position between the alignment device 310 and the body portion 301 is obtained, a set screw and/or friction between the alignment device 310 and the body portion 301 may be sufficient to maintain the relative position therebetween. In particular embodiments, the mounting device may be nonrotatably and linearly received in a mounting aperture, for example, by providing the exterior of the mounting device with a noncircular shape. Nonrotatable adjustment may be desirable in particular applications where the alignment device must be presented at a particular angular orientation with respect to the body portion when forming the aperture in the tube.

While the illustrated embodiment illustrates each alignment device being adjustable, it is possible that at least one alignment device may be nonadjustable. In one example, only a single alignment device is adjustable. For instance, the alignment device 310 and body portion 301 are provided as an integral, one-piece member. Providing an integral one-piece member may reduce the likelihood of misplacing parts of the alignment fixture in use and may simplify the procedure of using the alignment device by reducing the number of steps necessary to form the apertures in the tube. The alignment device 310 and the body portion 301 may be provided as an integral one-piece member in a variety of ways. For example, the body portion 301 may be molded or formed with the alignment device 310. Alternatively, the alignment device 310 may be formed separately and later integrally attached to the body portion, e.g., by welding, adhesive, or the like.

The alignment devices 310 may further include an elongated alignment aperture 313 adapted to align a portion 354 of an aperture forming tool 350 with respect to a location on the tube 200 where the corresponding aperture 208 is to be formed. For example, as shown, the elongated aperture 313 may be provided to align a drill bit of a drill in order to align the drill bit with respect to a location on the tube 200 wherein the aperture 208 is to be formed. The alignment device 310 can include an optional guard 312, such as a hardened steel bushing, adapted to facilitate an alignment function while protecting the remaining portions of the alignment device 310 from damage by the portion 354 (e.g., drill bit) of the aperture forming tool 350. The guard 312 may be particularly useful in applications where the alignment device 310 is otherwise formed from a relatively soft material, such as aluminum, plastics or the like. In particular exemplary embodiments, the entire alignment fixture 300, excepting the guard 312, might be formed from aluminum with a molding process.

Figure 8:
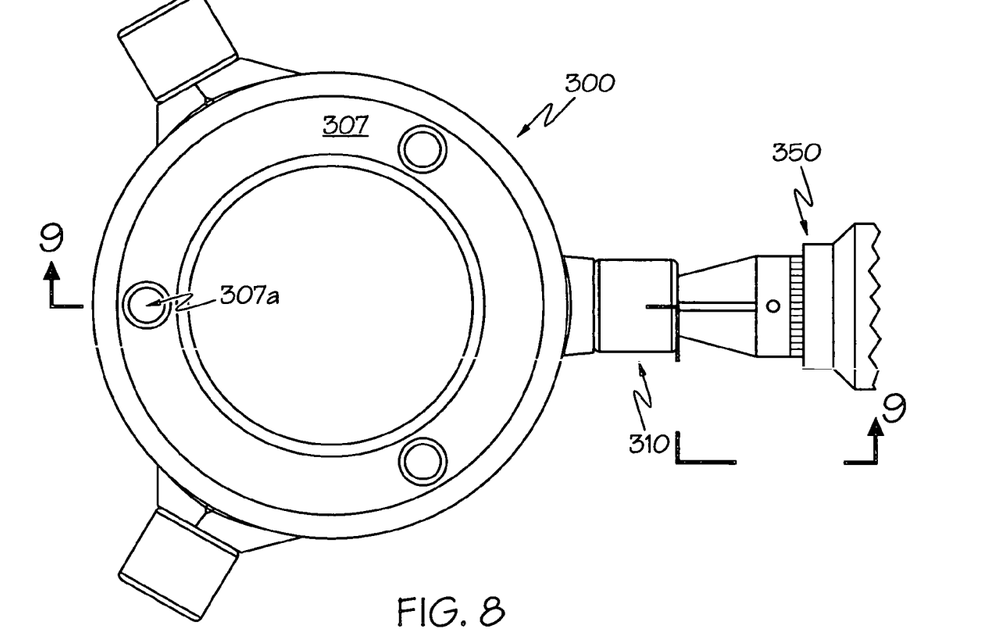
FIG. 8 illustrates a top view of the exemplary system of FIG. 7 and portions of an aperture forming tool.

The body portion 301 of the alignment fixture 300 may take a variety of shapes and forms, an example of which is shown in the embodiment illustrated in FIGS. 7-9. As shown, the body portion 301 can include an outer flange 302, an inner flange 304 spaced from the outer flange 302 and a bridge flange 307 attached between the outer flange 302 and the inner flange 304. The outer flange 302, inner flange 304 and bridge flange 307 are illustrated as substantially continuous walls. Fabricating the flanges as substantially continuous walls provides the walls with a substantially rigid and durable structure capable of performing the alignment function. It is understood that the flanges may alternatively comprise substantially noncontinuous elements, such as a mesh or framework of material. Providing the flanges as a mesh or framework of material may reduce material costs and/or reduce the weight of the alignment fixture while providing a substantially rigid structure that is capable of performing the alignment function.

As best shown in FIG. 9, the alignment device 310 is mounted to the outer flange 302, the inner flange 304 comprises the previously-mentioned angular registration structure, e.g., the slot 306, while the bridge flange 307 provides the previously-mentioned view ports 307a and axial registration structure, e.g., the inner surface 307b of the bridge flange 307. The outer flange 302 may also include an access window 305 to permit entry of a cutting tool and thereby facilitate formation of the slot 306 when fabricating the alignment fixture 300.

Figure 6:
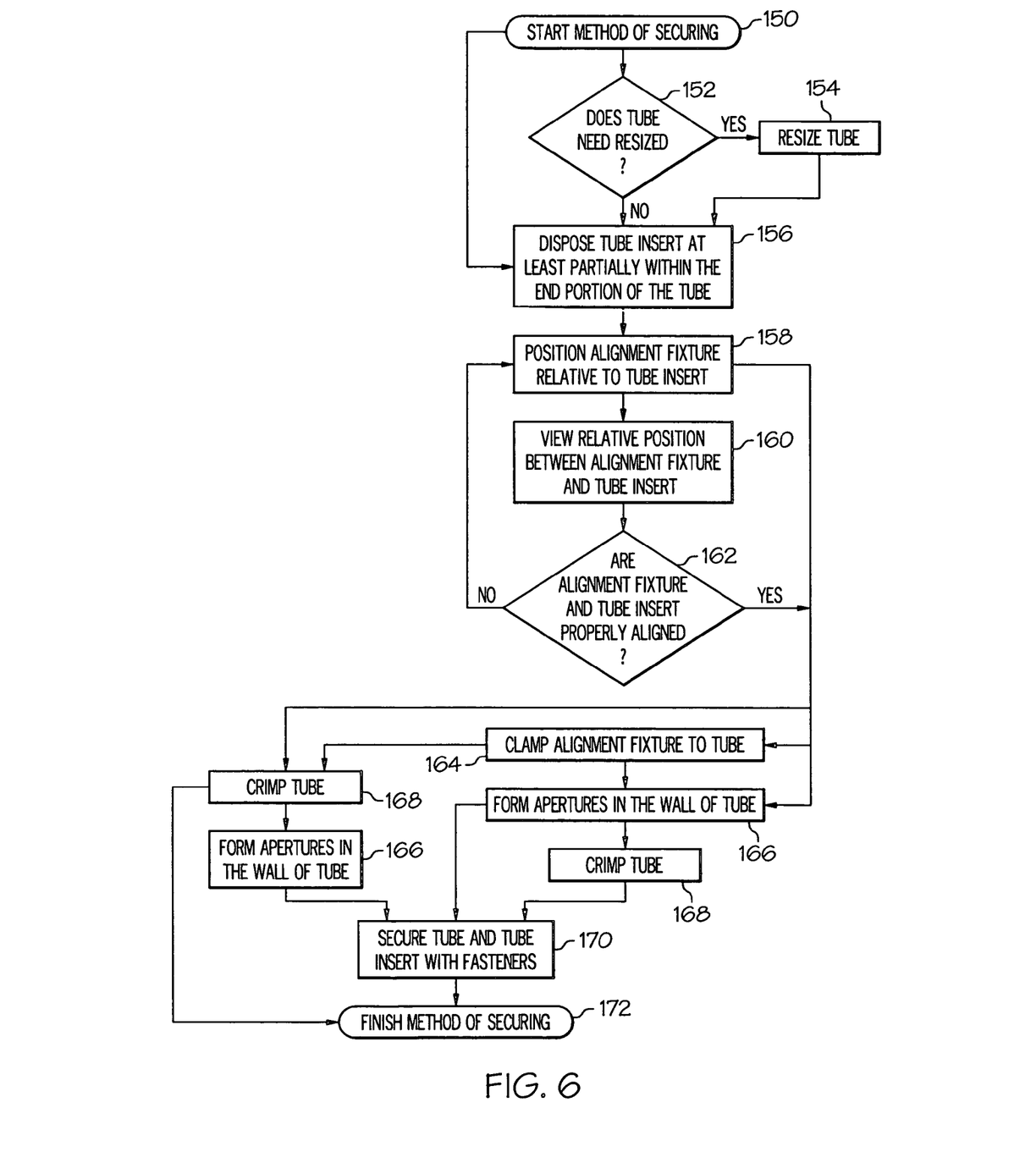
FIG. 6 is a flow chart illustrating steps of exemplary methods of securing a tube insert to an end portion of a tube.

Exemplary methods of securing a tube insert to an end portion of a tube will now be described with reference to FIGS. 6-9. With reference to FIG. 6, the exemplary method of securing begins at reference number 150. At step 150, an installer is provided with a tube 200 including an end portion and a wall 202 with an inner surface 204 and an outer surface 206. The installer is further provided with a tube insert 100 including a registration structure and a wall 102 with an inner surface 104 and an outer surface 106. The wall 102 of the tube insert 100 is provided with at least one cavity 112 in the outer surface 106 of the tube insert 100. The wall 102 of the tube insert 100 is also devoid of any openings extending through its inner and outer surfaces. Still further, the installer is provided with an alignment fixture 300 adapted to cooperate with the registration structure of the tube insert 100 to inhibit a relative movement between the alignment fixture 300 and the tube insert 100. The alignment fixture 300 is also provided with an alignment device 310. Finally, the installer is provided with an aperture forming tool 350 for forming an aperture through the wall of the tube.

As shown in FIG. 6, steps 152 and 154 are optional. For example, in applications where resizing of the tube 200 is not necessary, the installer may proceed directly to step number 156. However, the installer might first proceed to step 152 to determine whether the tube needs to be resized for use with a specific reservoir in a particular application. Resizing of the tube 200 may be useful, for instance, in applications where the installer intends to mount the tube 200 with respect to a liquid reservoir where the length of the tube depends on the depth of the liquid reservoir. Therefore, the installer may initially determine whether the tube 200 needs resized at step number 152. If the tube needs resized, the tube 200 is cut to the appropriate length at step 154 such that the tube may be customized for use with the particular liquid reservoir of interest.

Next, during step 156, the tube insert 100 and any associated seal 124 are disposed at least partially within the end portion of the tube 200, e.g., see FIGS. 7 and 9. For example, the second end portion 100b of the tube insert 100 is inserted into the end portion of the tube 200. The tube insert 100 may then be further inserted into an interior area of the tube 200 until the flared portion 108, e.g., the transition portion 111 of the flared portion 108, engages the edge 201 of the tube 200. Although not shown, the outer surface 106 of the tube insert 100 may be provided with a shoulder or other stop to provide an alternative registration structure to limit insertion of the tube insert 100 into the tube 200. In still further embodiments, no stop is engaged wherein a flared portion 108 of the tube insert 100 is spaced from the edge 201 of the tube 200.

Next, during step 158, the alignment fixture 300 is positioned relative to the tube insert 100 such that the alignment fixture 300 engages the registration structure of the tube insert 100 to inhibit a relative movement between the alignment fixture 300 and the tube insert 100 and to align the alignment device 310 with respect to the at least one cavity 112 in the wall 102 of the tube insert 100.

In one particular example, the registration structure of the tube insert 100 includes an angular registration structure, wherein the alignment fixture 300 is positioned relative to the tube insert 100 such that the alignment fixture 300 engages the angular registration structure of the tube insert 100 to inhibit a relative angular movement between that alignment fixture 300 and the tube insert 100. In the illustrated embodiment, for example, the tube insert is provided with an angular registration structure comprising a tongue 122 and the alignment fixture is provided with an angular registration structure comprising a slot 306. With such exemplary embodiments, the alignment fixture 300 is positioned relative to the tube insert 100 by inserting the slot 306 over the tongue 122 to inhibit, such as prevent, a relative angular movement between the alignment fixture 300 and the tube insert 100, and thereby facilitate a relative angular position of the tube insert 100 and alignment fixture 300 as shown in FIG. 9.

In still further examples, the registration structure of the tube insert 100 includes an axial registration structure, wherein the alignment fixture 300 is positioned relative to the tube insert 100 such that the alignment fixture 300 engages the axial registration structure of the tube insert 100 to inhibit a relative axial movement between that alignment fixture 300 and the tube insert 100. In the illustrated embodiment, for example, the tube insert 100 is provided with an axial registration structure comprising the upper surface 109 of the flared portion 108 and the alignment fixture is provided with an axial registration structure comprising the inner surface 307b of the bridge flange 307. With such exemplary embodiments, the alignment fixture 300 is positioned relative to the tube insert 100 by moving the alignment fixture 300 relative to the tube insert 100 until the inner surface 307b of the bridge flange 307 abuts the upper surface 109 of the flared portion 108. Therefore, further axial insertion is inhibited, such as prevented, wherein a relative axial position of the tube insert 100 and alignment fixture 300 is obtained.

After the step of positioning the alignment fixture 300 relative to the tube insert 100, the installer may optionally perform steps 160 and 162. At optional step 160, the installer may view the relative position of the alignment fixture 300 relative to the tube insert 100 prior to forming apertures in the wall of the tube. For example, the installer may use one or more view ports 307a of the bridge flange 307 to observe the relative position between the alignment fixture 300 and the tube insert 100. In one particular example, the view ports 307a comprise a plurality of view ports 307a, such as apertures, to ensure that the upper surface 109 of the flared portion 108 is abutting the inner surface 307b of the bridge flange 307. If a plurality of view ports 307a are provided, the relative position of the alignment fixture 300 and the tube insert 100 may be viewed at a plurality of locations to ensure a proper relative position between the alignment fixture 300 and the tube insert 100 about the periphery of the alignment fixture 300.

If the alignment fixture 300 is not positioned properly, the installer may backtrack to step 158 to again position the alignment fixture 300 relative to the tube insert 100. Otherwise, if the alignment fixture 300 is determined to be properly aligned with respect to the tube insert at step 162, the installer may then move to optional steps 164 or 168 or may decide to move directly to step 166.

For example, as shown, the installer may decide proceed to optional step 164 wherein the installer clamps the alignment fixture 300 relative to the tube 200. When performing step 164, the installer may adjust one or more of the alignment devices 310 such that the alignment fixture 300 is clamped to the tube 200. Adjustment, for example, might involve incremental rotation of each alignment device 310 with respect to the body portion 301 until adequate clamping and centering of the tube 200 with respect to the alignment fixture 300 is achieved. As the tube insert 100 may be axially and angularly registered with respect to the alignment fixture 300 as discussed above, the tube insert 100 may also be effectively coupled to the tube 200 by clamping the alignment fixture 300 to the tube 200. Although not shown, the alignment fixture may be clamped to the tube 200 with a set screw, pipe clamp or other clamping or fastening arrangement.

After step 164, the installer may proceed to optional step 168 or proceed directly to step 166. For example, at step 166, the installer may form the one or more apertures 208 in the wall 202 of the tube 200 with a portion of an aperture forming tool 350. As shown in FIGS. 8 and 9, for example, a drill bit 354 is inserted within an elongated alignment aperture 313 of the alignment device 310 until the drill bit 354 forms the aperture 208 in the wall 202 of the tube 200. The end of the chuck 352 of the drill 350 may be designed to abut the end of the alignment device 310, as shown in FIGS. 8 and 9, to limit the insertion of the drill bit 354 such that it enters the cavity 112 but does not engage the wall 102 of the tube insert 100. In alternative embodiments, a spacing collar may be provided adjacent the chuck to limit insertion of the drill bit.

After forming the one or more apertures 208 at step 166, the installer may then optionally perform step 168 or move directly to step 170. At step 168, the installer may remove the alignment fixture 300 and crimp a portion 210 of the tube 200 into the cavity 112. Such crimping function may be performed with a crimping tool wherein a hammer, such as a mallet, may be used with the crimping tool to crimp portions of the tube 200 adjacent the aperture 208 into the cavity 112. It is also contemplated that the crimping function may be performed immediately after forming the aperture and prior to removing the alignment fixture 300. In this application, the crimping tool may be inserted into the alignment device 310 in order to perform the crimping function. Alternatively, one or more of the alignment devices may be removed and the crimping tool may be inserted into the mounting aperture 308 in order to perform the crimping function.

At step 170, the cavity 112 in the wall 102 of the tube insert 100 and the aperture 208 formed in the wall 202 of the tube 200 are used to secure the tube insert 100 to the tube 200. For example, a fastener 212 (see FIG. 1), e.g., screw, rivet or the like, may be inserted into the cavity such that the fastener 212 engages the crimped portion 210 and the cavity. It is also contemplated that the fastener 212 may be attached without a crimped portion 210 by proceeding directly from step 166 to step 170. Alternatively, the crimped portion 210 may be formed when engaging the fastener 212 with the cavity wherein steps 168 and 170 are performed simultaneously. After the tube insert 100 is secured to the tube 200, the method of securing is completed at step 172.

As shown in FIG. 6, step 168 may be performed prior to step 166. That is, portions of the tube may be crimped into the cavity 112 prior to forming the apertures 208. During this process, the alignment devices 310 of the alignment fixture 300 may be used to guide a crimping tool such that it may crimp a portion of the tube at a predetermined location that is aligned with the hidden cavity. After formation of the crimped portions 210, the apertures 208 may then be formed with or without the assistance of the alignment fixture 300. Thereafter, steps 170 and 172 are performed as discussed above.

As described above, the step 168 of crimping is an optional step that might be performed before forming apertures in the wall of the tube. As shown in FIG. 6, in exemplary embodiments, the step of crimping 168 might be the last step before the method of securing is completed at step 172. In these embodiments, apertures might not be formed in the wall of the tube and fasteners might not be used to facilitate securement of the drop tube insert to the drop tube. Rather, the crimping step may independently provide sufficient securement of the drop tube insert to the drop tube.

As described above, exemplary embodiments illustrate the alignment device 310 adapted to receive a portion of an aperture forming tool 350 for forming an aperture. In alternative embodiments, the alignment device may be adapted to receive a portion of any tool to assist in securing the tube insert to the tube. For example, the tool might comprise a marking tool including a portion that can be received by the alignment device to provide an indication where a further step may be performed to assist in securing the tube insert to the tube. The marking device might comprise a pen, pencil, marker, scoring device, punching device or the like.

In exemplary embodiments, the step 166 of forming the apertures in the wall of the tube may include the steps of using an alignment device and a marking device to make appropriate marks on or in the wall of the tube, removing the alignment fixture from the tube, and then using an aperture forming tool to form one or more apertures relative to the one or more marks. In further exemplary embodiments, the step 168 may include the steps of using the alignment device and a marking device to make appropriate marks on or in the wall of the tube, removing the alignment fixture from the tube, and then using a crimping tool to perform a crimping step relative to the one or more markings.

The embodiments illustrated in the drawings depict the drop tube insert with the wall of the drop tube insert being devoid of any openings extending through its inner and outer surfaces. Alternative systems and methods in accordance with the present invention might include at least one through cavity such that at least one opening extends through the inner and outer surfaces.

The foregoing description of the various examples and embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

We claim:

1. A system adapted to cooperate with an aperture forming tool, the system comprising:
    a) a tube including a wall and an end portion;
    b) at least one fastener;
    c) a tube insert at least partially disposed within the end portion of the tube, the tube insert including a first registration structure, an outer surface, and at least one cavity in the outer surface for reception of the at least one fastener; and
    d) an alignment fixture including a second registration structure adapted to cooperate with the first registration structure of the tube insert to inhibit a relative movement between the alignment fixture and the tube insert, wherein the tube is disposed between the tube insert and the alignment fixture, such that the alignment fixture further includes at least one alignment device adapted to receive at least a portion of a tool to assist in forming at least one aperture through the wall of the tube at at least one predetermined location, such that the at least one aperture through the wall of the tube is aligned with the at least one cavity in the outer surface of the tube insert for utilization of the at least one fastener in attachment of the tube to the tube insert.

2. The system of claim 1, wherein the first registration structure comprises a first angular registration structure and the second registration structure comprises a second angular registration structure, wherein the first and second angular registration structures are adapted to cooperate with one another to inhibit a relative angular movement between the alignment fixture and the tube insert.

3. The system of claim 1, wherein the first registration structure comprises a first axial registration structure and the second registration structure comprises a second axial registration structure, wherein the first and second axial registration structures are adapted to cooperate with one another to inhibit a relative axial movement between the alignment fixture and the tube insert.

4. The system of claim 1, wherein the alignment device is adapted to clamp the alignment fixture to the tube.

5. The system of claim 1, wherein the alignment device includes an elongated alignment aperture adapted to receive a drill bit.

6. The system of claim 1, wherein the alignment fixture further comprises a body portion.

7. The system of claim 6, wherein the alignment device is mounted to the body portion.

8. A system adapted to cooperate with an aperture forming tool, the system comprising:
    a) a tube including a wall and an end portion;
    b) a tube insert at least partially disposed within the end portion of the tube, the tube insert including a first registration structure, an outer surface, and at least one cavity in the outer surface; and
    c) an alignment fixture including a second registration structure adapted to cooperate with the first registration structure of the tube insert to inhibit a relative movement between the alignment fixture and the tube insert, the alignment fixture further including an alignment device adapted to receive at least a portion of a tool to assist in forming an aperture through the wall of the tube at a predetermined location that is aligned with at least one cavity in the outer surface of the tube insert, wherein the alignment fixture further comprises a body portion such that the alignment device is mounted to the body portion, and wherein the alignment device is adjustably mounted to the body portion.

9. The system of claim 8, wherein the alignment device is adapted to clamp the alignment fixture to the tube by adjusting the alignment device with respect to the body portion.

10. The system of claim 8, wherein the body portion includes a mounting aperture and wherein at least a portion of the alignment device is adapted to adjustably engage the mounting aperture.

11. A system adapted to cooperate with an aperture forming tool, the system comprising:
    a) a tube including a wall and an end portion;
    b) a tube insert at least partially disposed within the end portion of the tube, the tube insert including a first registration structure, an outer surface, and at least one cavity in the outer surface; and
    c) an alignment fixture including a second registration structure adapted to cooperate with the first registration structure of the tube insert to inhibit a relative movement between the alignment fixture and the tube insert, the alignment fixture further including an alignment device adapted to receive at least a portion of a tool to assist in forming an aperture through the wall of the tube at a predetermined location that is aligned with at least one cavity in the outer surface of the tube insert, wherein the alignment fixture further comprises a body portion, wherein the body portion includes an outer flange, such that the alignment device is mounted to the outer flange of the body portion.

12. The system of claim 11, wherein the outer flange comprises a substantially continuous wall.

13. The system of claim 11, wherein the body portion further includes an inner flange spaced from the outer flange.

14. The system of claim 13, wherein the inner flange comprises the second registration structure.

15. The system of claim 14, wherein the first registration structure comprises a first angular registration structure and the second registration structure comprises a second angular registration structure, wherein the first and second angular registration structures are adapted to cooperate with one another to inhibit a relative angular movement between the alignment fixture and the tube insert.

16. The system of claim 15, wherein the first registration structure comprises a tongue and the second registration structure comprises a groove adapted to receive the tongue.

17. The system of claim 13, further comprising a bridge flange attached between the inner flange and the outer flange.

18. The system of claim 17, wherein the first registration structure comprises a first axial registration structure and the second registration structure comprises a second axial registration structure, wherein the first and second axial registration structures are adapted to cooperate with one another to inhibit a relative axial movement between the alignment fixture and the tube insert.

19. The system of claim 18, wherein the first registration structure comprises an upper surface of the tube insert and the second registration structure comprises an inner surface of the bridge flange.

20. The system of claim 17, wherein the bridge flange includes at least one view port to permit observation of a relative axial orientation between the alignment fixture and the tube insert.

21. The system of claim 20, wherein the view port includes at least one aperture extending through the bridge flange.

* * * * *